(12) United States Patent
Robinson et al.

(10) Patent No.: US 9,177,172 B2
(45) Date of Patent: Nov. 3, 2015

(54) SINGLE SYSTEM IMAGE VIA SHELL DATABASE

(71) Applicant: Microsoft Corporation, Redmond, WA (US)

(72) Inventors: Eric R. Robinson, Madison, WI (US); Alan D. Halverson, Verona, WI (US); Rimma V. Nehme, Madison, WI (US); Srinath Shankar, Madison, WI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 41 days.

(21) Appl. No.: 13/677,637

(22) Filed: Nov. 15, 2012

(65) Prior Publication Data

US 2014/0137237 A1 May 15, 2014

(51) Int. Cl.
*G06F 17/30* (2006.01)
*G06F 21/62* (2013.01)

(52) U.S. Cl.
CPC ...... *G06F 21/6227* (2013.01); *G06F 17/30592* (2013.01); *G06F 2221/2141* (2013.01)

(58) Field of Classification Search
CPC . Y10S 7/99933; G06F 17/30; G06F 17/3002; G06F 17/30477; G06F 21/6218; G06F 17/30094; G06F 17/30418; G06F 17/30938; G06F 12/31; G06F 21/6227; G06F 17/30592; G06F 2221/2141
USPC ............................................ 726/21; 707/802
See application file for complete search history.

(56) References Cited

U.S. PATENT DOCUMENTS

| 5,001,628 | A | 3/1991 | Johnson et al. |
| 6,847,957 | B1 | 1/2005 | Morley |
| 2003/0220935 | A1* | 11/2003 | Vivian et al. ................... 707/102 |
| 2004/0044685 | A1* | 3/2004 | Huynh et al. ............... 707/104.1 |
| 2005/0149584 | A1* | 7/2005 | Bourbonnais et al. ........ 707/204 |
| 2006/0195560 | A1* | 8/2006 | Newport ........................ 709/223 |
| 2007/0022087 | A1* | 1/2007 | Bahar et al. ....................... 707/1 |
| 2007/0294308 | A1* | 12/2007 | Megerian ...................... 707/200 |
| 2009/0205018 | A1* | 8/2009 | Ferraiolo et al. .................. 726/1 |
| 2009/0259641 | A1* | 10/2009 | Balmin et al. .................... 707/4 |
| 2010/0011000 | A1* | 1/2010 | Chakra et al. ..................... 707/9 |
| 2010/0023546 | A1* | 1/2010 | Silsby ........................... 707/102 |
| 2011/0307450 | A1* | 12/2011 | Hahn et al. .................... 707/649 |
| 2012/0303517 | A1* | 11/2012 | Kang ............................... 705/39 |
| 2013/0246340 | A1* | 9/2013 | Bender ......................... 707/602 |

OTHER PUBLICATIONS (Attached STIC NPL search).*

(Continued)

*Primary Examiner* — Matthew Smithers
(74) *Attorney, Agent, or Firm* — Aneesh Mehta; Kate Drakos; Micky Minhas

(57) ABSTRACT

A single system image is provided for a parallel data warehouse system by exposing a shell database within a database management system comprising metadata and statistics regarding externally stored data. Further, functionality of the database management system can be exploited to perform pre-execution tasks. In one instance, one or more execution plans can be generated by the database management system for an input command and subsequently employed to generate a distributed execution plan.

19 Claims, 7 Drawing Sheets

(56) References Cited

OTHER PUBLICATIONS

Tan, et al., "Shell over a Cluster (SHOC): Towards Achieving Single System Image via the Shell", Retrieved at <<http://ieeexplore.ieee.org/stamp/stamp.jsp?tp=&arnumber=1137725, In Proceedings of the IEEE International Conference on Cluster Computing (CLUSTER'02), 2002, pp. 8.

Truong, et al., "Distributed Shell over Peer-to-Peer Networks", Retrieved at <<http://citeseerx.ist.psu.edu/viewdoc/download-?doi=10.1.1.5.4338&rep=rep1&type=pdf>>, In Proceeding of the International Conference on Parallel and Distributed Processing Techniques and Applications, 2003, pp. 7.

Plattner, et al., "Extending DBMSs with Satellite Databases", Retrieved at <<http://citeseerx.ist.psu.edu/viewdoc/download-?doi=10.1.1.93.1768&rep=rep1&type=pdf>>, The International Journal on Very Large Data Bases, vol. 17 Issue 4, Jul. 2008, pp. 23.

"Private Database Cloud on Oracle Database Appliance", Retrieved at http://www.oracle.com/technetwork/database/database-cloud/privatedbcloudonoda-1522348.pdf, Jan. 2012, pp. 20.

Nehme, et al., "Automated Partitioning Design in Parallel Database Systems", Retrieved at <<http://www.cs.brown.edu/courses/cs227/papers/partitioning/p1137-nehme.pdf>>, In Proceedings of the 2011 ACM SIGMOND International Conference on Management of data, 2011, pp. 12.

\* cited by examiner

SINGLE SYSTEM IMAGE VIA SHELL DATABASE

BACKGROUND

Massively parallel processing (MPP) systems have been widely adopted in recent years. MPP systems are distributed systems including multiple, network connected, independent nodes (e.g., compute nodes). Each node is self-sufficient in that it includes its own processor, memory, and operating system, among other things. Employment of a plurality of such nodes enables high-scale parallel processing. MPP system are also referred to as "loosely-coupled" or "shared nothing" systems based on node independence, use of network communication, as well as unshared processors, memory, and storage.

Although not limited thereto, MPP systems are typically used as data warehouses. That is, MPP systems are employed to manage and query vast amounts of data. For contrast, consider a single machine, or node, data warehouse. In this scenario, scaling problems can exist in view of massive quantities of data that can be available in certain circumstances. A parallel data warehouse, or in other words a data warehouse embodied as an MPP system, solves this problem by enabling scale out across many machines, or nodes, while still providing an illusion of a single database to a user. The illusion is called a single system image. This image allows a user to pretend that a giant database exists that includes all data when in fact data is distributed over numerous databases.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to providing a single system image by way of a shell database. A shell database includes metadata and statistics regarding externally stored data, such as data distributed across a plurality of nodes comprising a parallel data warehouse. Stated differently, the shell database can represent an entire data warehouse, except that it does not include any user data but rather metadata. Thus, the shell database facilitates provisioning of a single system image of the data of a parallel data warehouse. Furthermore, the shell database can reside within a database management system, which can be exploited to perform pre-execution tasks. Pre-execution tasks that can be delegated to the database management system can include, input parsing, validation, authentication, and authorization, among other things. In one particular instance, the database management system can generate one or more execution plans as a function of an input command as well as metadata and statistics stored in the shell database that can subsequently be employed to generate a distributed execution plan.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
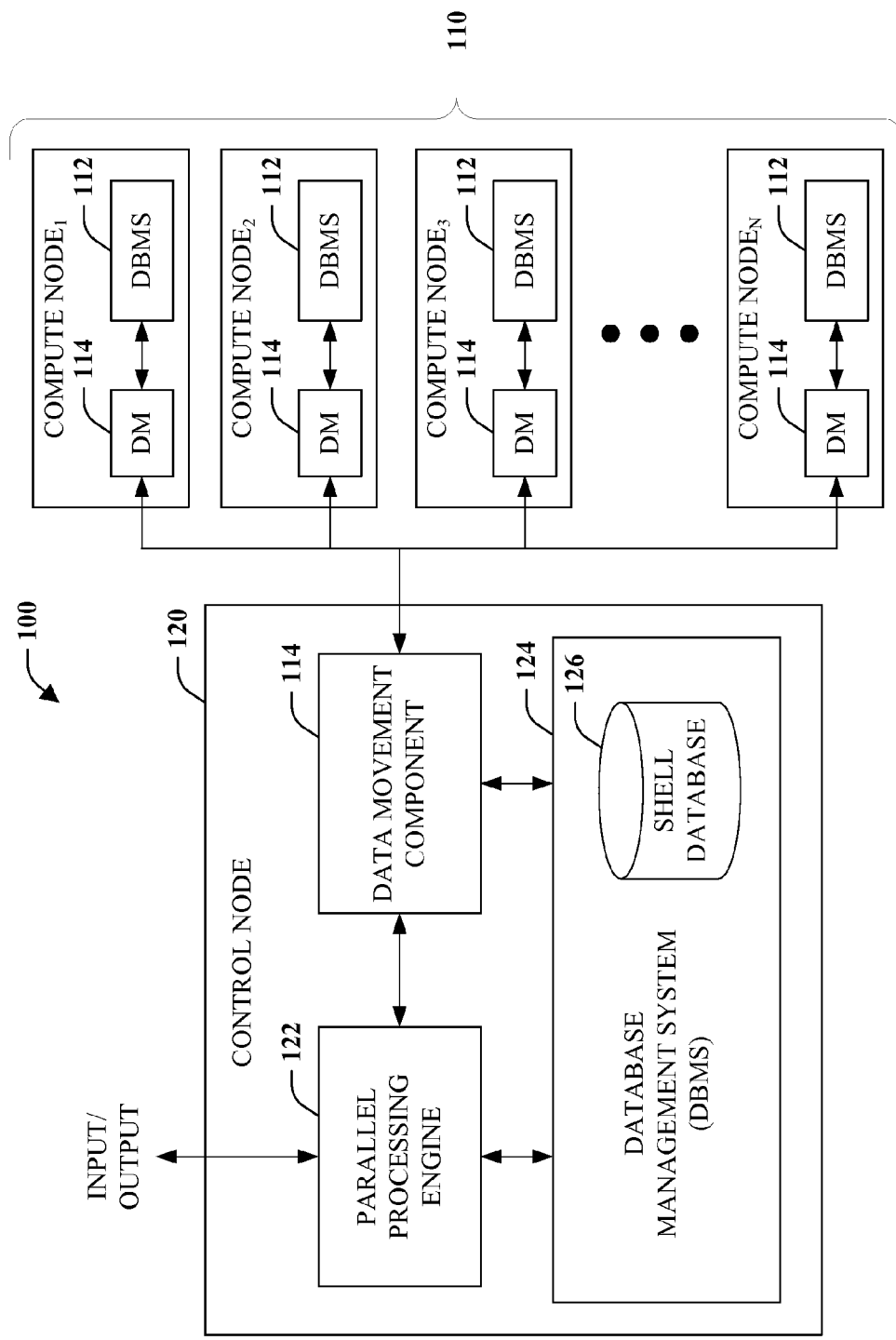
FIG. 1 is a block diagram of a parallel data warehouse system.

In accordance with one conventional implementation of a parallel data warehouse, a plurality of compute nodes can exist and one can be designated for control, namely a control node. Each node can include a database management system, among other things. Further, the control node can interact with the other compute nodes and provide a single system image. More particularly, the control node can include a parallel processing engine that accepts commands comprising statements, parses the statements, validates the statements for correctness, authenticates and authorizes a user, and performs actions. Rather than storing all data on the control node, metadata is stored regarding data stored on other nodes to enable provisioning of a single system image. The metadata is stored in a database in conjunction with a control node instance of a database management system.

A disadvantage to this approach is duplicative implementation of significant amount of functionality. In particular, the parallel parsing engine duplicates pre-execution task functionality provided by a database management system. In effect, the parallel processing engine seeks to pretend it is a single database management system when it is not. Further, the parallel processing engine has to maintain metadata and other information. In other words, the database management system is treated as a dumb container maintained by the parallel processing engine. The database management system, however, includes functionality associated with pre-execution tasks such as parsing, validation, authentication, authorization, and execution plan generation that has been developed to be industrial strength over many years.

Details below are generally directed toward providing a single system image by way of a shell database. A shell database is generated within the context of a database management system to include metadata and statistics that describes data stored elsewhere, such as in distributed compute node databases. Furthermore, pre-execution tasks can be delegated to the database management system to at least reduce the amount of duplicate functionality with respect to providing a single system image and exploit generations of development with respect to single node systems for the benefit of parallel systems. Pre-execution tasks that can be delegated to the database management system can include, but are not limited to, parsing, validation, authentication, authorization, and execution plan generation. With respect to execution plan generation, for example, a database management system can generate one or more execution plans as a function of an input command as well as metadata and statistics stored in the shell database that can subsequently be employed to generate a single distributed execution plan.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Referring initially to FIG. 1, a parallel data warehouse system 100 is illustrated. The parallel database warehouse is implemented as a massively parallel processing (MPP) system including a plurality of compute nodes 110 (COMPUTE NODE$_1$-COMPUTE NODE$_N$, where N is a positive integer) and a control node 120.

The compute nodes 110 are appliance nodes in which each node includes hardware (e.g., processor, memory . . . ) and software (e.g., operating system, applications . . . ) combined as one box. In other words, the, compute nodes 110 are independent and self-sufficient. Further, each compute node can include and use its own user data and computer resources to perform a portion of a parallel processing. Here, each compute node includes a database management system (DBMS) 112, or more particularly an instance of a database management system, that controls the creation, maintenance, and use of a database. By way of example and not limitation, the DBMS can be SQL Server® by Microsoft Corporation, Rdb™ by Oracle Corporation, or DB2® by Internal Business Machines Corporation. Each compute node 110 also includes a data movement component 114 configured for communication and data transfer with other compute nodes, as will be described further later herein.

The control node 120, similar to the compute node 110, is an appliance node and includes hardware (e.g., processor, memory . . . ) and software (e.g., operating system, applications . . . ) combined as one box. Furthermore, the control node 120 is the central point of processing input commands regarding data definition, manipulation, retrieval, or security, for instance. The control node 120 can receive a user command as input by way of a system interface, create a distributed execution plan, communicate relevant plan operations and data to compute nodes 110, receive results from the compute nodes 110, perform any requisite aggregation of results, and return the results.

More particularly, the control node 120 includes parallel processing engine 122 (which can be a component as defined herein). The parallel processing engine 122 is configured to receive user input in the form of a command regarding data definition, manipulation, retrieval, or security. In a data warehouse, the most prominent command relates to data retrieval. Accordingly, the command can comprise a number of statements specifying a query (e.g., specified in SQL) against the parallel data warehouse system 100. The parallel processing node 120 is also configured build a distributed execution plan associated with an input command, execute the distributed execution plan, and output returned results. The parallel processing engine 122 can also interact with database management system 124 and delegate pre-execution tasks to the database management system 124.

The database management system 124 includes shell database 126. The shell database stores metadata and statistics regarding data that is stored external thereto across database management system instances of the compute nodes 110. Stated differently, the shell database 126 does not include any user data but rather metadata and statistics regarding the user data. Otherwise, the shell database is indistinguishable from a database that contains actual data. For example, metadata for user tables partitioned across the compute nodes 110 can be utilized to compile and generate a space of execution alternatives. Metadata can also include information regarding users and privileges to enable checking for security and access rights. Global statistics for all data distributed across compute nodes 110 can be included. To compute global statistics, local statistics can first be computed on each compute node 110 and then merged together to produce global statistics. In accordance with one embodiment, the database management system 124 can be the same as the database management system 112 residing in a compute node 110 except that the database management system 124 includes the shell database 126 to store metadata and statistics regarding user data housed in a database created and maintained by the database management system 112.

The data movement component 114 is configured to move data between nodes in the system 100. Certain steps of an input command, or query, may necessitate intermediate result sets to be moved from one compute node 110 to another. In addition, sometimes intermediate result sets from one or more compute nodes 110 may be moved to the control node 120 for final aggregations and sorting prior to returning a result set to a client. Temporary tables, for example, can be utilized on the control node 120 and the compute nodes 110 as needed to move data or store intermediate results. In some cases, commands can be written that do not generate temporary tables and results can be streamed from the compute nodes directly back to the client. Such commands need not involve the data movement component 114.

Figure 2:
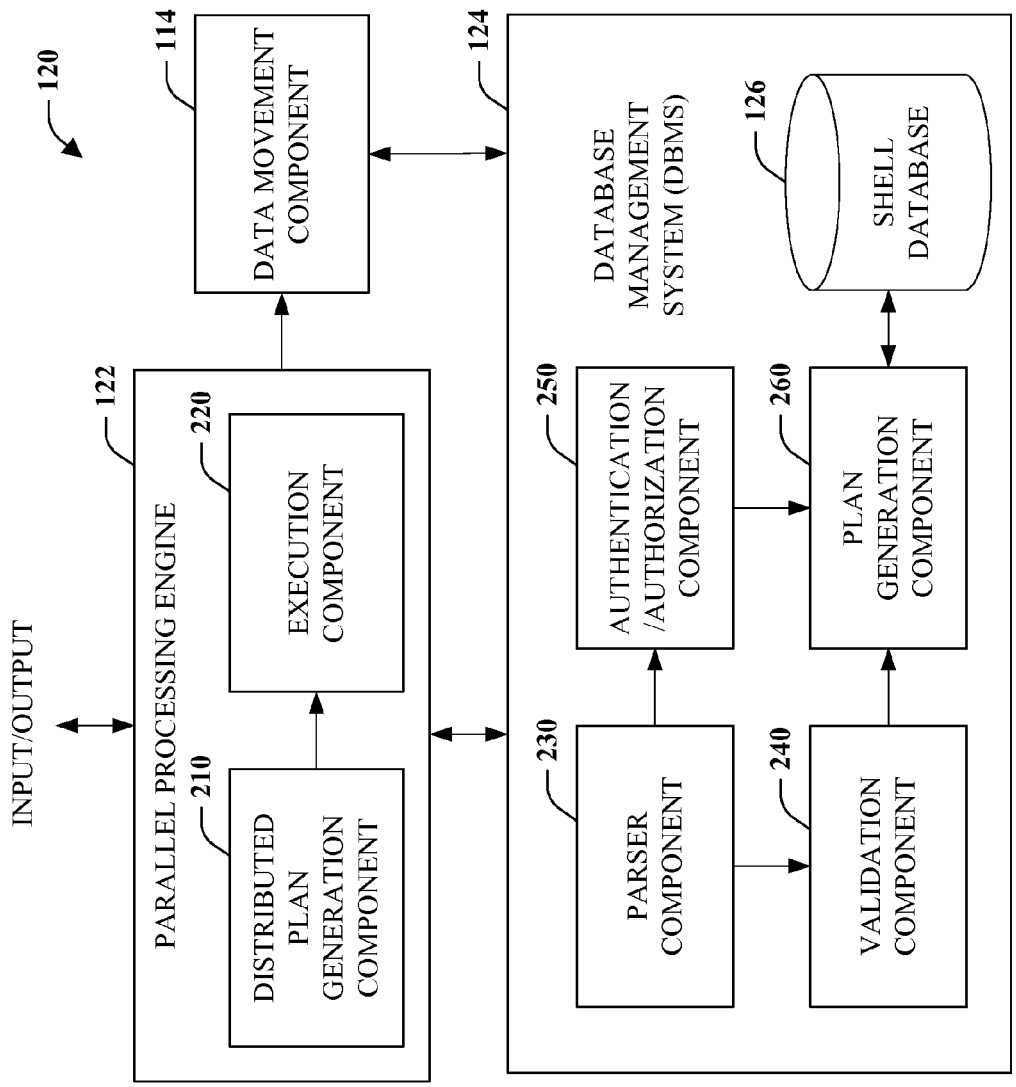
FIG. 2 is a block diagram of a representative control node.

FIG. 2 illustrates a representative control node 120 in further detail. At least a portion of input commands concerning data definition, manipulation, retrieval, or security, for instance specified in SQL (Structured Query Language), can be provided to the database management system 124. Functionality provided by the database management system 124 can be exploited to perform pre-execution tasks.

The database management system 124 includes parser component 230, validation component 240, authentication/authorization component 250, plan generation component 260, and the shell database 126. The parser component 230 is configured to parse an input string and create an abstract syntax tree for use in subsequent processing. The validation component 240 is configured to validate (or invalidate) the input based on a set of syntax rules. The authentication/authorization component 250 is configured to authenticate the identity of a user submitting a command, for example by way of user name and password, and determine whether the user is authorized to execute the command based on security data stored in the shell database 126. If the input is valid and the user submitting the input is authorized, the plan generation component 260 can be employed.

The plan generation component 260 is configured to generate one or more serial (e.g., single node) execution plans based on the input command as well as the metadata and statistics stored in the shell database 126. In accordance with one exemplary embodiment, the plan generation component 260 can generate an operator tree that represents an algebraic form of input and perform logical (as opposed to physical, or partition dependent) exploration on the operator trees to determine or infer plan alternatives. In one instance, the plan generator component 260 can output the optimal (minimal cost) serial execution plan. In another instance, the plan generator component 260 can output a space of alternatives or, in other words, a plurality of serial execution plans. Further, the plurality of serial execution plans can be encoded compact structure as groups of alternatives, for example in XML (eXtensible Markup Language). In at least SQL Server®, this construct can be an internal memo structure.

Distributed plan generation component 210 of the parallel processing engine 122 is configured to generate a distributed, or parallel, execution plan from one or more serial execution plans provided by the database management system 124. In one instance, the distributed plan generation component 210 can traverse the serial execution plans and add data movement strategies to the search space. Hence, candidate distributed execution plans can include operations to be executed against data of underlying compute node database-management-system instances, and data movement operations, which are operations to transfer data between database-management-system instances on different nodes. Subsequently or concurrently, costs can be added to, or otherwise associated with candidate distributed execution plans based on a cost model that models the cost of data movement operations, among other things. The minimal cost candidate distributed-execution plan can be selected as the optimal plan.

The execution component 220 is configured to execute the selected distributed execution plan. The plan can be executed by walking a list of plan actions and distributing the actions to compute nodes. For instance, the execution component 220 can begin by initiating movement of data in accordance with the plan by way of the data movement component 114 and subsequently initiate execution of operations of data by database-management-system instances on compute nodes.

By way of example, and not limitation, assume that a "Customer" table is hash-partitioned on "c_custkey" and the "Orders" table is hash-partitioned on "o_orderkey," and a user wants to perform the following join (specified in SQL) between these two tables:

```
SELECT c_custkey,
    o_orderdate
FROM Orders, Customer
WHERE o_custkey = c_custkey AND o_totalprice > 100
```

The table partitioning is not compatible with the join since "Orders" is not partitioned on "o_custkey." Thus, a data movement operation is needed to evaluate the above query. A distributed execution plan can thus include two steps. First, a data movement operation can be performed that repartitions data in the "Orders" table on "o_custkey" in preparation for the join. Second, the data operations can be performed that selects tuples for the final result set from each compute node and returns them back the control node.

In the above example, the data movement operation can specify (1) a statement required to extract source data, (2) a tuple routing policy (e.g., replicate or hash-partition on a particular column), and (3) a name of a (temporary) destination table. Subsequently, the data movement operation can be broadcast from the control node to the data-movement-component instance on each compute node. Upon receiving the data movement message, the data movement component on each compute node begins execution of the data movement operation by issuing the following SQL statement against the local database management system.

```
SELECT o_custkey,
    o_orderdate
FROM Orders
WHERE o_totalprice > 100
```

Each data-movement-component instance reads the result tuples out of the local data base management system, routes the tuples to the appropriate data movement process by hashing on "o_custkey," and inserts the tuples it receives from other data-movement-component instances into the specified local destination table (e.g., Temp_Table). Once all of the tuples from the source SQL statement have been inserted into their respective destinations, the data movement operation is complete.

After the data movement operation has completed, the second step of the plan can be executed, which is the SQL operation that is used to pull the result tuples from each compute node. To perform this operation, a connection can be obtained to a database-management-system instance on each compute node and a specified SQL statement is issued. In this case, the statement that will be executed is as follows.

```
SELECT c.c_custkey,
    tmp.o_orderdate
FROM Customer c,
    Temp_Table tmp
WHERE c.c_custkey = tmp.o_custkey
```

To complete the request, the execution component 220 can read the result tuples from each compute node, package them into the final result, and send them be to the requesting client/user. Execution is now complete. From the user's perspective, it appears as if all the data was stored and all the computation took place in a single database-management-system instance on the control node 120.

In the parallel data warehouse system described herein, the shell database 126 and the full system including the compute nodes 110 should be mutually consistent in terms of logical structure. Input commands can result in changes to the structure. Accordingly, changes should be applied consistently and atomically to the full system and the shell database. Commands that can cause a change to the shell database can fall into one or three broad categories: security, data definition, and data manipulation.

Commands that update security metadata are straightforward to manage and apply. The relevant update to security policy can be enacted by simply executing original, raw security command itself against the shell database. There is no need to execute the command anywhere else because the security policy only needs to reside in the shell in order for it to be effective for the system.

Maintaining the security policy exclusively in the shell is sufficient, because all commands can be run through the shell database 126 before being executed elsewhere. For an arbitrary query, for instance, if the user is authorized to execute the query on the shell database, then the user is authorized to run the query in the full system including the compute nodes. If the user does not have authority to run the query in full system then, the query will be rejected by the shell database well before anything actually is sent to the full system.

Commands that define data, for instance by way of a data definition language (DDL), are more complex to manage than statements pertaining to security. One reason is that data definition statements affect a data schema that lives both on the shell database and on the full system vis-à-vis the compute nodes. Despite the distributed nature of an update, data definition commands are still rather straightforward to apply. More specifically, an update can be applied by issuing an identical and deterministic command that performs the requested action against the shell database first, and then against the compute nodes. A distributed transaction coordination mechanism can be employed in order to ensure that that the updated is applied atomically and consistently. If data definition updates are deterministic, enrolled in a distributed transaction, and applied on the shell database and throughout the rest of the system, they will preserve consistency between the shell database and the full system.

Commands that manipulate data, for example utilizing a data manipulation language (DML), affect the full system directly. Given that the shell database has no tuples, or user data, in it, data manipulations with respect to the compute nodes lead to deferred, indirect effects on the shell database. The reason for this indirect effect is that manipulations lead to changes in the statistics (e.g., histogram) of files affected by the manipulation. This affects the shell database because the shell database strives to appear as if it includes all of the data in the entire system stored in one location.

Even though the shell database does not actually store any tuples, it can support this illusion by overwriting empty statistics that would naturally and normally have with approximations of the statistics that it would have if it really did manage all the data locally. Thus, a change to any of the statistics on any database-management-system instance on the nodes may lead to an update to statistics that reside in the shell database. This update can be deferred, however, since the shell database statistics only need to be updated in response to an update statistics command.

In accordance with one aspect, the parallel data warehouse system 100 of FIG. 1 can be embodied as an appliance including a combination of hardware and software designed to work together as one box to provide data warehousing functionality. Here, multiple servers can be utilized to implement scale-out processing in a shared nothing fashion, and users can access the appliance through an appliance interface. This approach allows cost effective and incremental growth of the appliance by adding extra servers or storage. Additionally, as the appliance grows over time, server components can be upgraded or individually replaced with newer generations of more powerful central processing units (CPUs), memory, and storage, among other things. Nevertheless, the subject system 100 is not limited to the appliance embodiment. Additionally or alternatively, rather than data being stored on an appliance node, data can be stored on by an external system, for example on distributed servers (e.g., Hadoop). In other words, data can be stored on any physical backend and need not form part of an appliance.

What has been discussed thus far is metadata centralized on the control node. The claimed subject matter, however, is not limited thereto. In accordance with another embodiment, metadata can be fully replicated. In other words, metadata is for the entire system is replicated on each node in the system. In this case, there is a difference between how metadata is maintained. Other metadata distribution strategies are also contemplated between centralized and fully replicated, for example.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the plan generation component 260 and/or distributed plan generation component 210 can employ such mechanism to determine or infer an execution plan, for example based on execution history, among other things.

In view of the exemplary systems described supra, methodologies that may be implemented in accordance with the disclosed subject matter will be better appreciated with reference to the flow charts of FIGS. 3-6. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 3:
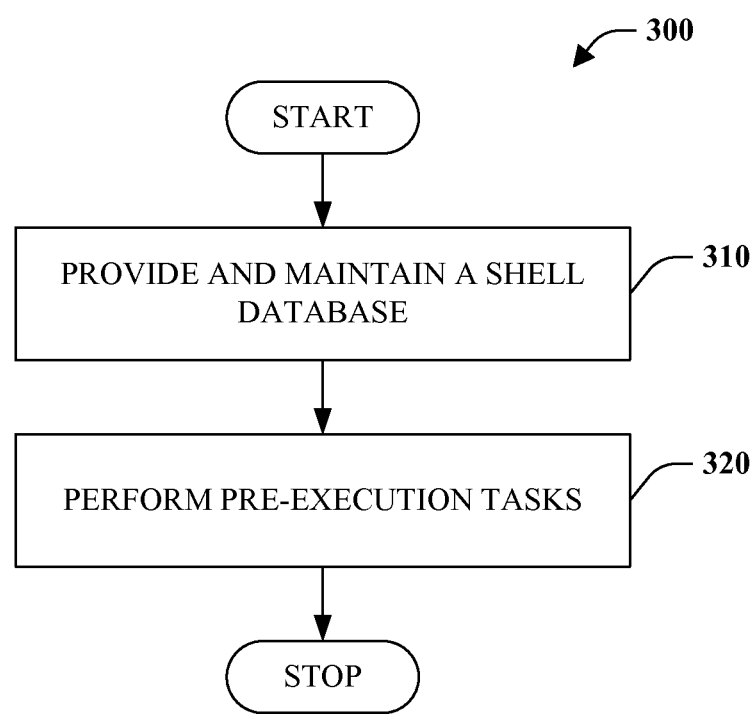
FIG. 3 is a flow chart diagram of a method of provisioning a parallel data warehouse.

Referring to FIG. 3, a method of provisioning a parallel data warehouse 300 is illustrated. At reference numeral 310, a shell database is provided and maintained. The shell database can include metadata regarding externally stored data. In other words, the shell database does not store user data but rather data about the user data including data structures distributed across compute nodes, and users and permissions, among other things. Thus, for every table that logically exists in a data warehouse, an empty version of the table with the same schema can exists in the shell database. Similarly, for every user that exists in the data warehouse, an identical user with the same username and password and privilege set exists in the shell database. Further, the shell database can provide and maintain global statistics, such as statistical properties of table columns, concerning externally stored data. Stated differently, although tables in a shell database do not include tuples, or, in other words, user data, statistics are maintained so that it appears as if the table is actually as large as the true full version of the table would be if all its data were centralized in one location. The shell database including metadata and statistics regarding an entire system facilitates providing a single system image associated with a parallel data warehouse. At numeral 320, pre-execution tasks are performed by a database management system associated with the shell database. By way of example, and not limitation pre-execution tasks can include: parsing, authentication, authorization, schema lock management, schema policy management, schema object management, security language surface alignment, binding, statement validation, optimization plan search space generation and data type propagation. By exploiting functionality of the database management system, it is unnecessary to duplicate such code with in a parallel processing component, for example. In this manner, the database management system can be tightly integrated with the parallel data warehouse system.

Figure 4:
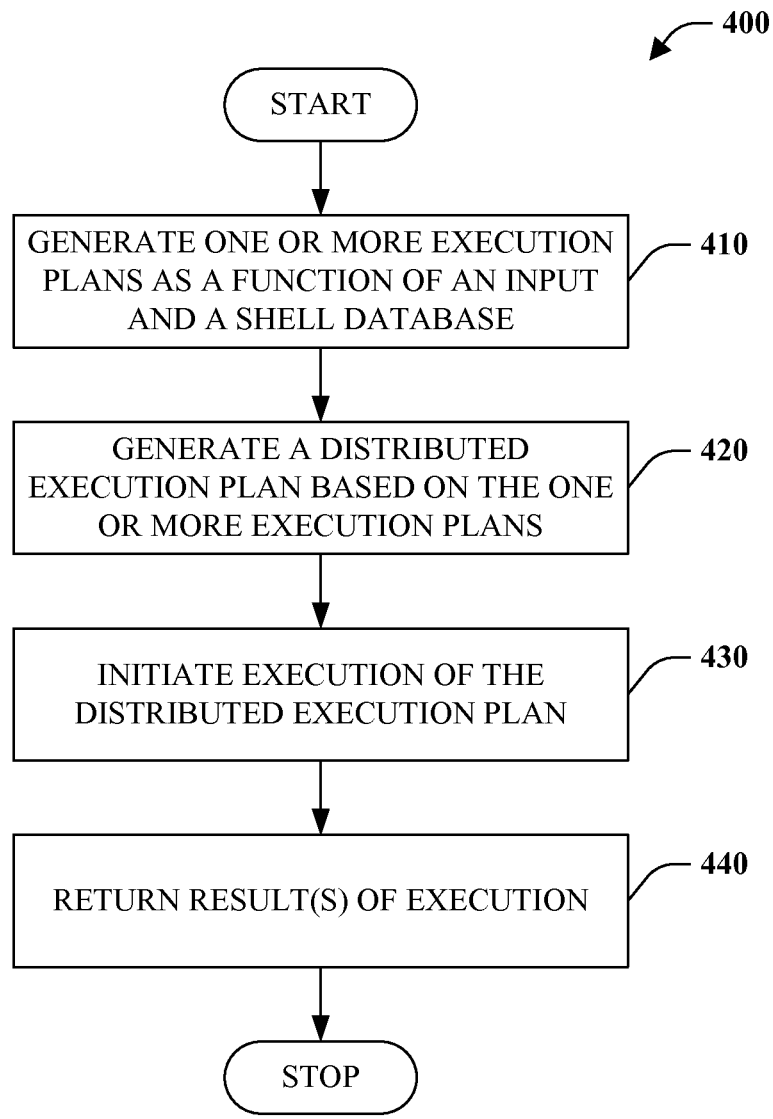
FIG. 4 is a flow chart diagram of a method of parallel data warehouse execution.

FIG. 4 depicts a method of parallel data warehouse execution 400. At reference numeral 410, one or more execution plans are generated as a function of an input command a shell database. In other words, one or more serial or single node execution plans can be produced based on an input command as well as metadata and statistics afforded by a shell database. At numeral 420, a distributed or parallel execution plan is generated based on the one or more serial or single node execution plans. For example, a plan with minimal cost with respect to distributed execution can be selected and data movement operations can be added thereto. At reference numeral 430, execution of the distributed execution plan can at least be initiated. At 440, one or more results of the execution can be returned.

Figure 5:
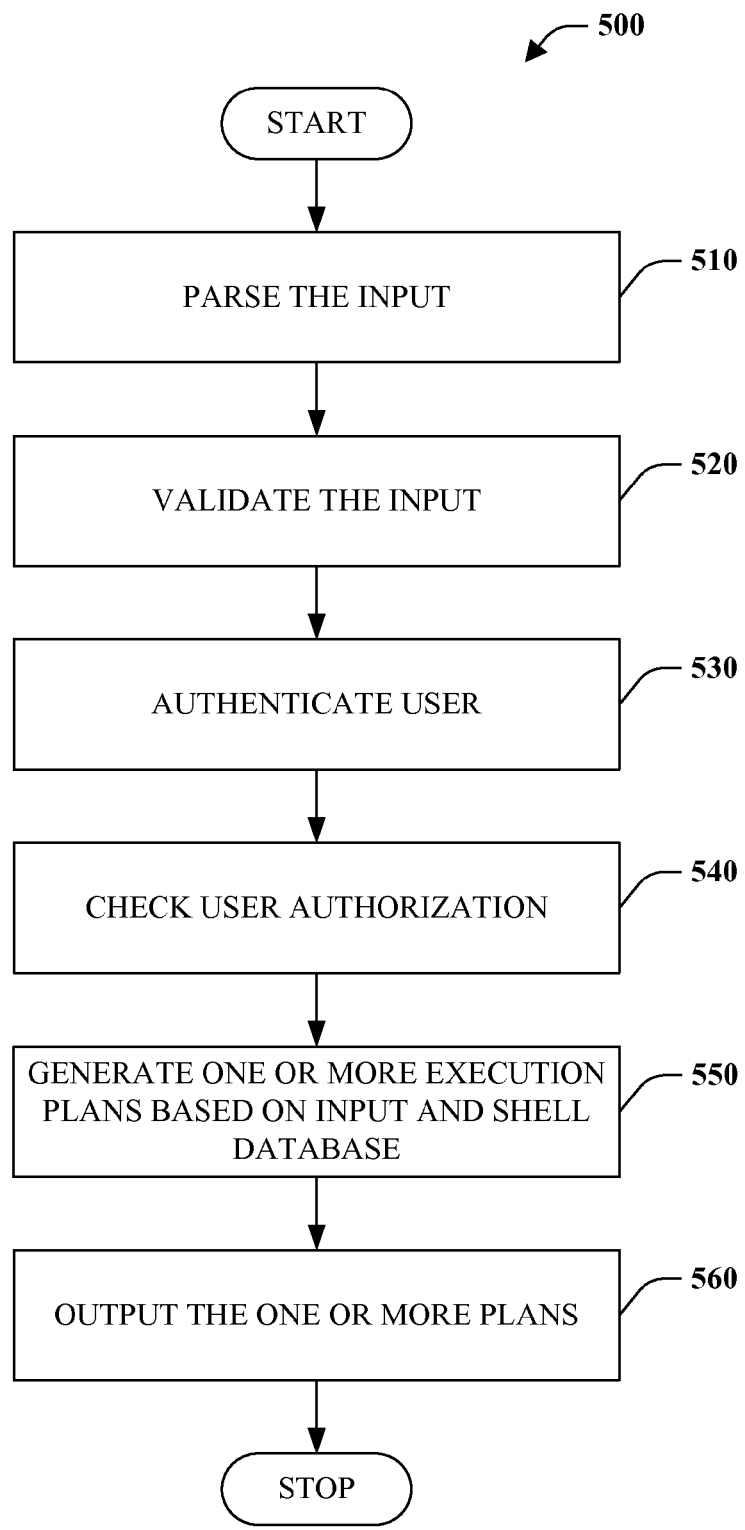
FIG. 5 is a flow chart diagram of a method of generating an execution plan.

FIG. 5 shows a method of execution plan generation 500, which in can be performed by a database management system on a control node, for example. At reference numeral 510, an input command is parsed, for instance into an abstract syntax tree (AST) to facilitate subsequent processing. At numeral 520, the input command is validated against a set of syntax rules. Stated differently based on the syntax rules an input can be either valid or invalid. At 530, the identity of a user is authenticated, for example by user name and password. User authorization is then checked at 540 against a set of permissions associated with a user identity. At numeral 550, one or more execution plans are generated based on the input command and the shell database including metadata and statistics. The one or more plans are output at reference numeral 560.

Figure 6:
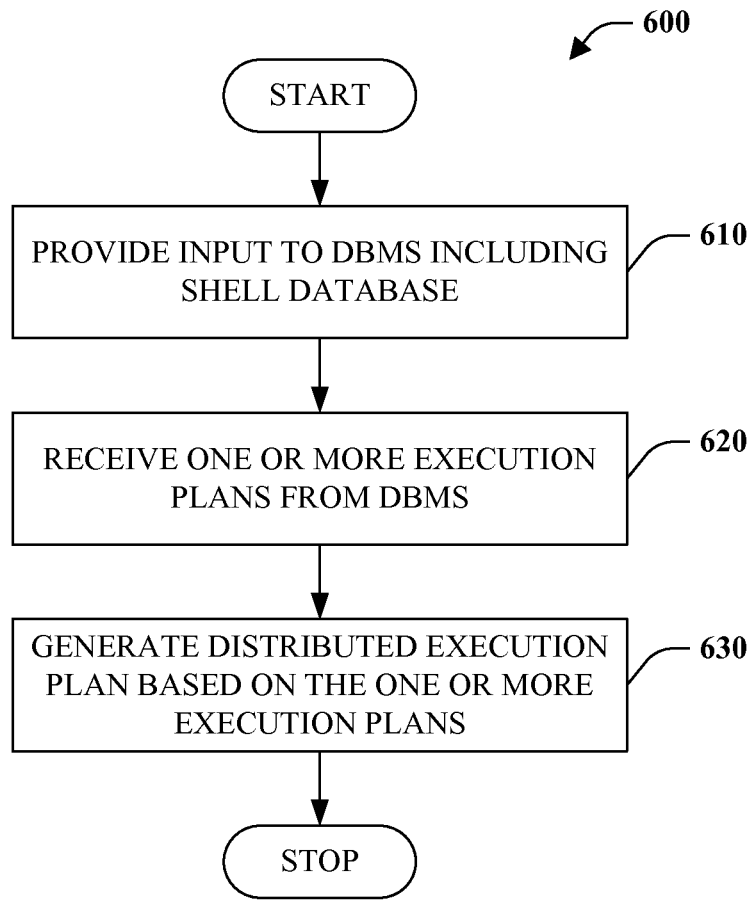
FIG. 6 is a flow chart diagram a method of generating a distributed execution plan.

FIG. 6 a flow chart diagram of a method of distributed execution plan generation 600 is illustrated. At numeral 610, an input command is provided to a data management system including a shell database. At reference 620, one or more execution plans are received from the database management system. Such execution plans pertain to serial or single node command execution. A distributed execution plan is generated at reference numeral 630 based on the one or more received execution plan. The distribute execution plan can correspond to selection of a serial execution plan based on minimal execution cost in a distributed environment as well as addition of one or more data movement operations.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the terms "component," and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A' employs 'Y,'" or "'A' employs both 'X' and 'Y,'" then "'A' employs 'X' or 'Y'" is satisfied under any of the foregoing instances.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 7:
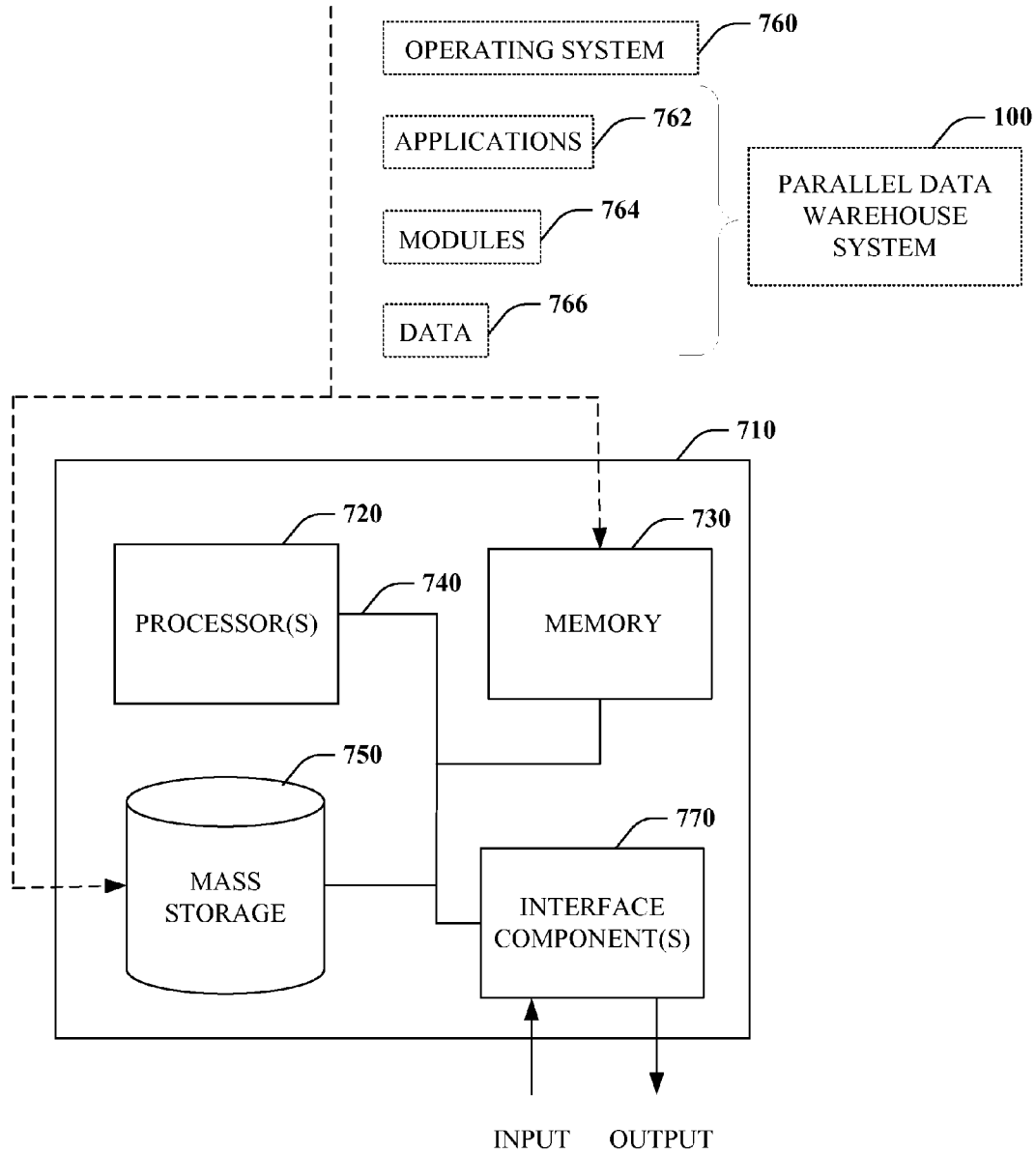
FIG. 7 is a schematic block diagram illustrating a suitable operating environment for aspects of the subject disclosure.

In order to provide a context for the claimed subject matter, FIG. 7 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 7, illustrated is an example general-purpose computer 710 or computing device (e.g., desktop, laptop, tablet, server, hand-held, programmable consumer or industrial electronics, set-top box, game system, compute node . . . ). The computer 710 includes one or more processor (s) 720, memory 730, system bus 740, mass storage 750, and one or more interface components 770. The system bus 740 communicatively couples at least the above system components. However, it is to be appreciated that in its simplest form the computer 710 can include one or more processors 720 coupled to memory 730 that execute various computer executable actions, instructions, and or components stored in memory 730.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration.

The computer 710 can include or otherwise interact with a variety of computer-readable media to facilitate control of the computer 710 to implement one or more aspects of the claimed subject matter. The computer-readable media can be any available media that can be accessed by the computer 710 and includes volatile and nonvolatile media, and removable and non-removable media. Computer-readable media can comprise computer storage media and communication media.

Computer storage media includes volatile and nonvolatile, removable and non-removable media implemented in any method or technology for storage of information such as computer-readable instructions, data structures, program modules, or other data. Computer storage media includes memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums which can be used to store the desired information and which can be accessed by the computer 710. Furthermore, computer storage media excludes modulated data signals.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 730 and mass storage 750 are examples of computer-readable storage media. Depending on the exact configuration and type of computing device, memory 730 may be volatile (e.g., RAM), non-volatile (e.g., ROM, flash memory . . . ) or some combination of the two. By way of example, the basic input/output system (BIOS), including basic routines to transfer information between elements within the computer 710, such as during start-up, can be stored in nonvolatile memory, while volatile memory can act as external cache memory to facilitate processing by the processor(s) 720, among other things.

Mass storage 750 includes removable/non-removable, volatile/non-volatile computer storage media for storage of large amounts of data relative to the memory 730. For example, mass storage 750 includes, but is not limited to, one or more devices such as a magnetic or optical disk drive, floppy disk drive, flash memory, solid-state drive, or memory stick.

Memory 730 and mass storage 750 can include, or have stored therein, operating system 760, one or more applications 762, one or more program modules 764, and data 766. The operating system 760 acts to control and allocate resources of the computer 710. Applications 762 include one or both of system and application software and can exploit management of resources by the operating system 760 through program modules 764 and data 766 stored in memory 730 and/or mass storage 750 to perform one or more actions. Accordingly, applications 762 can turn a general-purpose computer 710 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the parallel data warehouse system 100, or portions thereof, can be, or form part, of an application 762, and include one or more modules 764 and data 766 stored in memory and/or mass storage 750 whose functionality can be realized when executed by one or more processor(s) 720.

In accordance with one particular embodiment, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the parallel data warehouse system 100 and/or associated functionality can be embedded within hardware in a SOC architecture.

The computer 710 also includes one or more interface components 770 that are communicatively coupled to the system bus 740 and facilitate interaction with the computer 710. By way of example, the interface component 770 can be a port (e.g., serial, parallel, PCMCIA, USB, FireWire . . . ) or an interface card (e.g., sound, video . . . ) or the like. In one example implementation, the interface component 770 can be embodied as a user input/output interface to enable a user to enter commands and information into the computer 710, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 770 can be embodied as an output peripheral interface to supply output to displays (e.g., CRT, LCD, plasma . . . ), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A computer-implemented method, comprising: providing a single system image with a shell database within a database management system, the shell database is devoid of user data and consists of metadata and statistics regarding the user data stored external to the shell database; and invoking, by a processor, functionality afforded by the database management system to perform one or more pre-execution tasks associated with a received input command including generating one or more single-node execution plans based on the input command and the metadata and statistics of the shell database.

2. The method of claim 1 further comprises generating a distributed execution plan outside the database management system based on one of the one or more single-node execution plans.

3. The method of claim 2, generating the distributed execution plan based on a compact structure produced by the database management system that encodes a plurality of the execution plans as groups of alternatives.

4. The method of claim 2 further comprises initiating execution of the distributed execution plan over a plurality of compute nodes.

5. The method of claim 1, invoking the functionality afforded by the database management system further comprises parsing at least a portion of the input command.

6. The method of claim 1, invoking the functionality afforded by the database management system further comprises validating at least a portion of the input command.

7. The method of claim 1, invoking the functionality afforded by the database management system further comprises performing one of user authentication or authorization.

8. The method of claim 1, invoking the functionality afforded by the database management system further comprises updating the statistics in the shell database in response to changes in the metadata or the user data.

9. A system, comprising:
a first component configured to generate one or more single-node execution plans based on an input command and a shell database within a database management system, the shell database is devoid of user data and consists of metadata and statistics regarding user data stored external to the shell database; and
a second component configured to generate a distributed execution plan based on the one or more single-node execution plans.

10. The system of claim 9, the input command is a statement that specifies at least one of data definition, manipulation, retrieval, or security.

11. The system of claim 9 further comprises a third component configured to move data among at least a subset of a plurality of compute nodes housing portions of the user data.

12. The system of claim 9 further comprises a third component within the database management system configured to parse the input command.

13. The system of claim 9 further comprises a third component within the database management system configured to validate or invalidate the input command.

14. The system of claim 9 further comprises a third component within the database management system configured to perform at least one of user authentication or authorization.

15. A computer-readable storage medium having instructions stored thereon that enable at least one processor to perform a method upon execution of the instructions, the method comprising:
generating a plurality of single-node execution plans based on an input command and a shell database within a database management system, the shell database is devoid of user data and consists of metadata and statistics regarding the user data stored external to the shell database on a plurality of distributed compute nodes;
generating a distributed execution plan outside the database management system based on the plurality of single-node execution plans;
initiating execution of the distributed execution plan across at least a subset of the plurality of compute nodes; and
returning one or more results of the execution.

16. The computer-readable storage medium of claim 15, the method further comprising initiating movement of the user data among the plurality of distributed compute nodes.

17. The computer-readable storage medium of claim 15, the method further comprises invoking a database management functionality to validate the input command.

18. The computer-readable storage medium of claim 15, the method further comprises invoking database management functionality to authenticate a user who submitted the input command.

19. The computer-readable storage medium of claim 18, the method further comprises invoking database management functionality to check if the user is authorized to execute the input command.

* * * * *